(No Model.) 2 Sheets—Sheet 1.

T. C. LORD.
HORSE HAY RAKE.

No. 268,109. Patented Nov. 28, 1882.

Witnesses.
Thos. H. Hutchins
Wm. J. Hutchins

Inventor.
Tyler C. Lord.

(No Model.) 2 Sheets—Sheet 2.
T. C. LORD.
HORSE HAY RAKE.
No. 268,109. Patented Nov. 28, 1882.
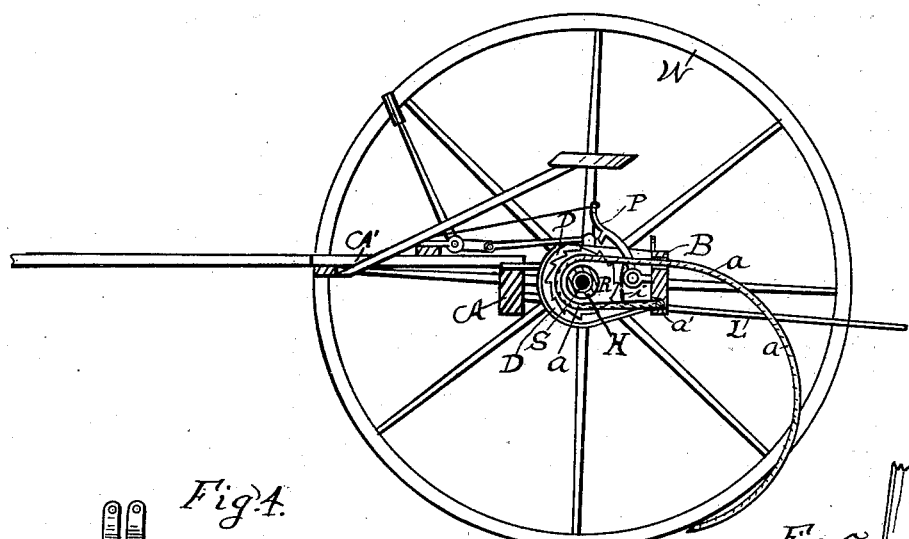
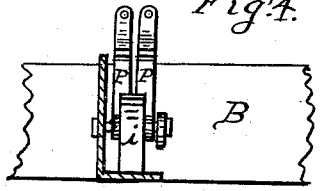
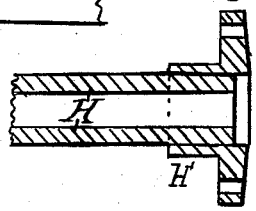
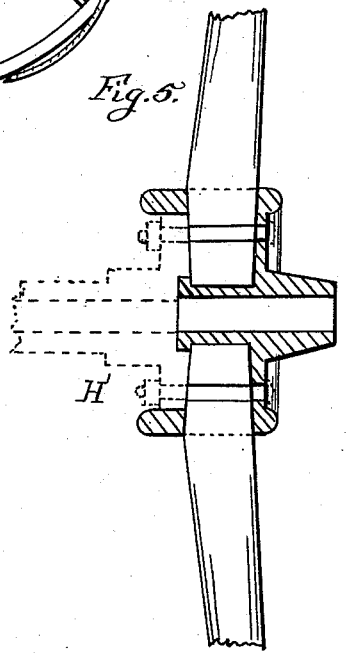
Witnesses.
Thos. H. Hutchins.
Wm. J. Hutchins.
Inventor.
Tyler C. Lord.

UNITED STATES PATENT OFFICE.

TYLER C. LORD, OF JOLIET, ILLINOIS, ASSIGNOR OF ONE-HALF TO FRANK E. MARSH, OF SAME PLACE.

HORSE HAY-RAKE.

SPECIFICATION forming part of Letters Patent No. 268,109, dated November 28, 1882.

Application filed June 29, 1882. (No model.)

*To all whom it may concern:*

Be it known that I, TYLER C. LORD, of the city of Joliet, in Will county and State of Illinois, have invented certain new and useful Improvements in Horse Hay-Rakes, the construction and operation of which I will proceed to explain, reference being had to the annexed drawings, and the letters and figures thereon, in which—

Figure 1:
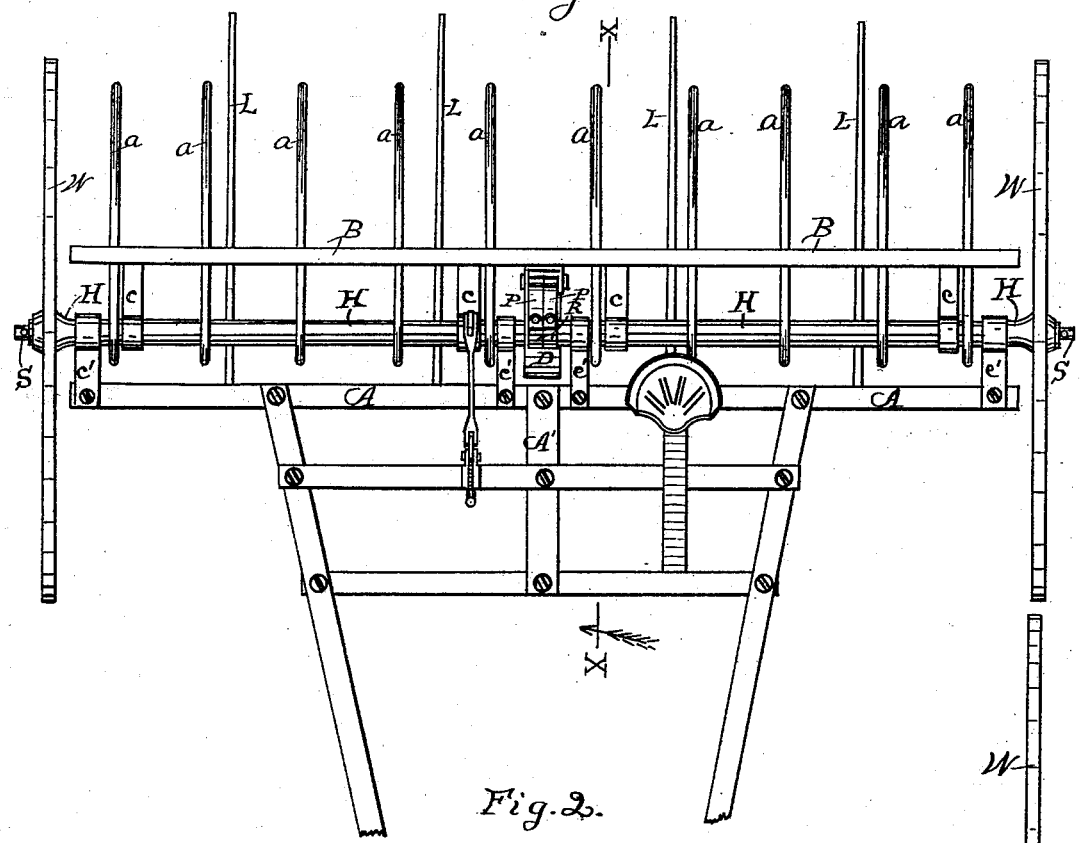
Figure 2:
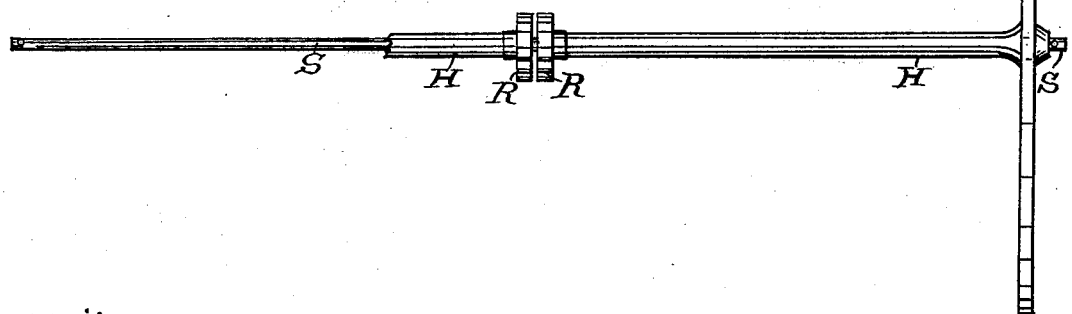

Figure 1 is a plan view on the top; Fig. 2, a plan view on the top of the axle and elongated hubs; Fig. 3, a cross-sectional view on line $x$, Fig. 1, looking in the direction of the arrow; Fig. 4, a front elevation of the pawls and spring that supports them; Fig. 5, a vertical central sectional view of the hub of the wheel, and Fig. 6 a vertical central section of the end of the elongated hub next the wheel.

This invention relates to certain improvements in horse hay-rakes of the class that rake by means of a series of hooked spring-teeth arranged to be elevated and lowered to rake and discharge their load at the will of the operator, and is intended to be an improvement of the rake for which this applicant did, on the 13th day of January, 1882, file an application for Letters Patent of the United States, and on the 7th day of June, 1882, was duly allowed.

In this invention the traveling wheels W have elongated hubs H on their inner sides, extending to near the center of the rake from either way, through which passes the axle S, upon which the wheels revolve. The axle S lies loose in the hubs H, and runs through the entire length of the machine, and holds it together by means of the linchpins or nuts on its outer ends. The elongated hubs H form the rake-head, around which the rake-teeth $a$ are bent loosely, to permit the oscillation or "drop" of the rake-teeth up and down as they drag along over the earth. The rake-teeth $a$ are hinged in the lower edge of the tooth-board B, and after inclosing the hubs H return through the tooth-board through an aperture having a diameter coextensive with that of each of the teeth. The tooth-board is attached to the machine by means of the arms $c$, which are journaled to the hubs H, as shown in Fig. 1, so the hub H may rotate in the journals of said arms. The inner ends of the elongated hubs are provided with ratchets R, (shown more particularly in Fig. 2,) firmly attached thereto, so as to rotate with the hubs H. Immediately in the rear of the said ratchets are a pair of pawls, P P, hinged at their lower ends to the front side of the tooth-board B, and held upright by a spring, $i$, engaging with them both, as shown in Fig. 4. An eye in the top of the pawls holds a cord, as shown in Fig. 3, by means of which they may be pulled forward, so they will engage with the teeth of the ratchets R, the result of which is, the rotation of the ratchets will elevate the tooth-board B, containing the teeth $a$, so their load may be discharged. A stop on the cross-head A in front arrests the further rotation of the tooth-board with the pawls and disengages the pawls from the ratchets, so that the tooth-board and the teeth will fall back to their original position. The spring $i$ prevents the contact of the pawls with the ratchets until they are brought forward, as aforesaid. As the spring $i$ engages with both pawls, when one is pulled forward it carries with it the spring $i$, and thus permits the other pawl to follow, so both pawls will engage with the ratchets at once. A hand-lever (shown in Fig. 3) is used, as in most such rakes, to hold the teeth $a$ off the ground while traveling from one field to another. The cross-head A, containing the stripping-teeth L, attaches to the machine by means of the arms $c'$, journaled to the elongated hubs H, as shown in Fig. 1. The elongated hubs H are constructed with a flange on their ends, next the wheel, as shown in Figs. 5 and 6, and are attached to the hubs of the wheel by means of bolts passing through, as shown in Fig. 5, for the purpose of facilitating shipment by detaching the wheels from the machine by removal of said bolts. The hubs H are provided with offsets H', next the wheels, to keep the arms $c'$ from the wheels. The rake-head, consisting of the two elongated hubs H and the axle S, passing through them, form the support for the entire rake, the whole forming a most simple, light, and durable rake.

Having thus described my invention, what I claim as new, and desire to secure by Letters Patent, is as follows, to wit:

In a horse hay-rake, the elongated hubs H, containing the loose axle S, and having the offsets H' and flanges on their ends next the wheels W, for attachment thereto by means of bolts, and having the ratchets R on their inner ends to elevate the tooth-board B, containing the rake-teeth a, which inclose the said hubs H loosely forming the rake-head, all arranged as and for the purpose set forth.

TYLER C. LORD.

Witnesses:
THOS. H. HUTCHINS,
WM. J. HUTCHINS.